INVENTORS
CHAANG HUANG
BENJAMIN H. WHITE
BY Elmer J. Nealon
ATTORNEY

United States Patent Office 3,113,217

Patented Dec. 3, 1963

3,113,217

TRIGGER CIRCUITS EMPLOYING TRANSISTORS OF COMPLEMENTARY CHARACTERISTICS

Chaang Huang and Benjamin H. White, Ipswich, Mass., assignors, by mesne assignments, to Sylvania Electric Products Inc., Wilmington, Del., a corporation of Delaware Filed Aug. 3, 1955, Ser. No. 526,157
8 Claims. (Cl. 307—88.5)

The present invention relates to transistor trigger circuits, and more particularly to a trigger circuit having a pair of junction transistors of complementary type.

It is an object of this invention to utilize the converse characteristics of p-n-p and n-p-n transistors to produce an output voltage swing in response to an applied impulse, said swing being of twice the value that can be derived from the circuit of either transistor individually.

A further object is to provide a bistable network adapted to change from one condition of stability to the other upon input pulses of either polarity.

A still further object is to provide a bistable transistor network characterized by low power drain during relatively long periods in one state, for use particularly in switching operations that occur at comparatively infrequent intervals.

Another object is to provide means for utilizing a circuit of the above type in the monostable form to produce a pair of output pulses of equal magnitude but opposite polarity with respect to a common ground connection.

With the above and other objects in view, a principal feature of the invention resides in the use of a p-n-p and n-p-n transistor in a mutual feedback circuit. In both the monostable and bistable variants, the two transistors are turned "on" and "off" together rather than alternately, as is commonly the case in flip-flop circuits.

According to another feature, each transistor is provided with a suitable base bias to cause it to reach the "on" condition in the absence of an appreciable opposing feedback voltage from the other transistor. For each transistor the collector bias is of appropriate polarity to permit the flow of collector current.

The circuit is made monostable by the insertion of capacitors in one or both of the feedback circuits, whereby the "off" conditions of the transistors are but briefly sustained after the disappearance of the trigger impulse.

Figure 1:
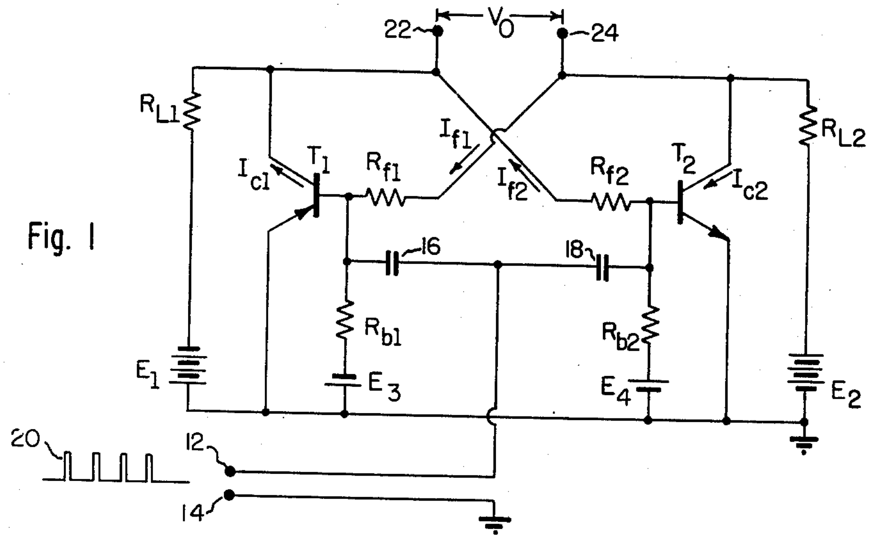
Figure 2:
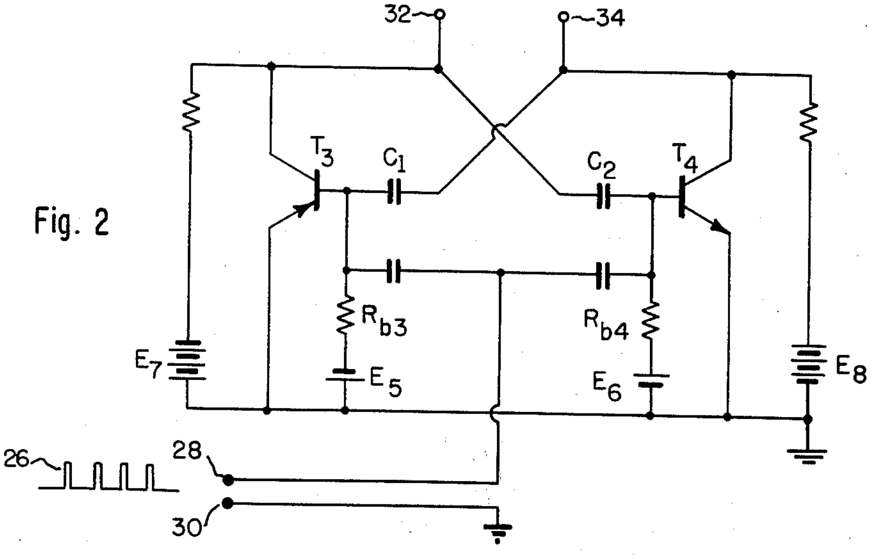

Other features of the invention comprise certain circuits and arrangements that will be more fully understood with reference to the following description of a preferred embodiment, in conjunction with the appended drawings in which:

FIG. 1 is a schematic circuit diagram illustrating the bistable form of the invention; and FIG. 2 is a circuit diagram showing a monostable form of the invention.

Referring more particularly to FIG. 1, there are provided a pair of transistors $T_1$ and $T_2$ which may be of the junction type, and of low or relatively high power output as may be required by the given load. The transistor $T_1$ is of the p-n-p type, as indicated by the conventional arrow pointed toward the base at the emitter connection. The transistor $T_2$ is of the n-p-n type, as indicated by the reversed arrow. As will be understood, these arrows indicate the directions of current flow for the "on" or high conduction state.

The base of the transistor $T_1$ is connected with the collector of the transistor $T_2$ through a feedback resistor $R_{f1}$. Similarly, the base of the transistor $T_2$ is connected through a feedback resistor $R_{f2}$ with the collector of the transistor $T_1$. The collectors of the transistors $T_1$ and $T_2$ are connected, respectively, through resistors $R_{L1}$ and $R_{L2}$ and batteries $E_1$ and $E_2$, to ground. In the described embodiment the emitters are grounded.

Input terminals 12 and 14 are connected between ground and the bases of the transistors $T_1$ and $T_2$, through capacitors 16 and 18, respectively. The circuit is designed to receive input pulses of either polarity, as indicated by the waveform 20 or its inverse, and to produce an output voltage between terminals 22 and 24, or between either of these terminals and ground.

The base of the transistor $T_1$ is connected with ground through a resistor $R_{b1}$ and a battery $E_3$. Similarly, the base of the transistor $T_2$ is connected with ground through a resistor $R_{b2}$ and a battery $E_4$. It will be noted that the batteries $E_3$ and $E_4$ are connected reversely with respect to ground. The voltage of the battery $E_3$ is sufficiently high to tend to bias the transistor $T_1$ normally to the "on" condition. The voltage of the battery $E_4$ is similarly of sufficient magnitude to tend to bias the transistor $T_2$ "on."

In order to permit a more complete understanding of the invention, the operation is described as follows:

It may be assumed that in the initial state, the transistors $T_1$ and $T_2$ are both "on." In this state, a current $I_{c1}$ flows from the collector of the transistor $T_1$, through the resistor $R_{L1}$, the battery $E_1$ and the emitter of the transistor $T_1$, back to its collector. Similarly, a current $I_{c2}$ flows from the emitter of the transistor $T_2$, through the battery $E_2$, the resistor $R_{L2}$, and the collector of the transistor $T_2$, back to its emitter. The resulting voltage drops across the resistors $R_{L1}$ and $R_{L2}$ are of such polarities and magnitudes as to reduce the potentials of the output terminals 22 and 24, respectively, to substantially equal values near ground. This result arises from the fact that in each circuit just described, the emitter-to-collector impedance is very much smaller than either the resistor $R_{L1}$ or $R_{L2}$, as the case may be; hence, the voltage drops across these impedances nearly equal those across the batteries.

With the collectors both near ground potential, small currents $I_{f1}$ and $I_{f2}$ flow through the respective feedback circuits. The voltage drops across the resistors $R_{b1}$ and $R_{b2}$ are then of such polarities as to tend to oppose the batteries $E_3$ and $E_4$, respectively. But the feedback resistance values $R_{f1}$ and $R_{b1}$ are such that the base of the transistor $T_1$ remains sufficiently negative with respect to the emitter to sustain the assumed collector current $I_{c1}$. For a similar reason, the potential at the base of the transistor $T_2$ is sufficiently more positive than that of the emitter to sustain the collector current $I_{c2}$.

The above-described state of the circuit is stable, and continues until a suitable input pulse is applied between the terminals 12 and 14. If a positive input pulse is applied to these terminals, it will tend to increase the collector current of the transistor $T_2$, but will have the opposite effect upon the collector current of the transistor $T_1$. Thus, the current $I_{c1}$ is stopped, and the potential of the collector of the transistor $T_1$ swings negatively to a value near that of the battery $E_1$. This negative voltage swing, being applied to the base of the transistor $T_2$ through the resistor $R_{f2}$, and being effective for a short but finite period after the disappearance of the positive input pulse, stops the emitter and collector currents of the transistor $T_2$, thus causing the potential at the collector of the transistor $T_2$ to swing to a more positive value under the influence of the battery $E_2$. This positive swing, applied through the resistor $R_{f1}$ to the base of the transistor $T_1$, is of the same polarity as the pulse which originally shut "off" this transistor. The effect of the input pulse, therefore, is to increase the current in each feedback circuit, and as long as these currents flow both of the transistors remain in the "off" or low conduction state.

For similar reasons, the transistors can also be shut "off" by a negative input pulse. Such a pulse first suppresses collector current in the transistor $T_2$, which, upon reaching the "off" state, suppresses collector current in the transistor $T_1$.

It will thus be seen that while the batteries $E_3$ and $E_4$ are of such magnitudes and polarities as to tend to turn the transistors "on," the simultaneous existence of substantial feedback currents $I_{f1}$ and $I_{f2}$, which tend to offset the biasing effects of the respective batteries, holds the transistors in the "off" state. A pulse which tends to turn either transistor "on" destroys this state, and causes both transistors to turn "on." As above stated, pulses of positive or negative polarity are equally effective to change the state of the circuit, and in fact the change of state from one stable condition to the other can be accomplished by a pulse of either polarity indiscriminately.

In the "off" state, the potential at the terminal 22 is below ground by substantially the voltage of the battery $E_1$. Similarly, the potential at the terminal 24 is above ground by substantially the voltage of the battery $E_2$. Thus, with batteries of equal voltage, the potential between the terminals 22 and 24 is substantially twice the voltage of either battery.

The circuit illustrated in FIG. 2 is substantially the same as that of FIG. 1, except that the resistors $R_{f1}$ and $R_{f2}$ have been replaced by condensers $C_1$ and $C_2$, respectively. This change results in a monostable circuit, which is stable in the "on" condition. As in the case of FIG. 1, input pulses of the form illustrated by the waveform 26 or their inverse are applied to terminals 28 and 30, and an output signal is taken between terminals 32 and 34 or between either of these latter terminals and ground. The operation is as follows.

Assuming that transistors $T_3$ and $T_4$ which are of the p-n-p and n-p-n type, respectively, are momentarily in the "on" condition, the respective collectors are near ground potential, as explained above. In the steady state, the capacitors $C_1$ and $C_2$ prevent the flow of feedback current between the collector of either transistor and the base of the other transistor. The base bias of each transistor is therefore equal to the full voltage across either the battery $E_5$ or the battery $E_6$ as the case may be. In this condition the currents are stable.

As in the case of FIG. 1, the appearance of a positive or a negative input pulse at the bases of both transistors results directly in suppressing the emitter-to-base current of the transistor $T_3$ or $T_4$, according to polarity. This produces a positive swing in the collector voltage in the case of the transistor $T_4$ and a negative swing in the case of the transistor $T_3$, which is transmitted through the condenser $C_1$ or $C_2$ to the base of the transistor $T_3$ or $T_4$, respectively. The feedback currents are sustained, however, only during the charging times of the capacitors $C_2$ or $C_1$, which are functions of the time constants $R_{b4}C_2$ and $R_{b3}C_1$. It is only during this brief interval that the cessation of base-to-emitter current in each transistor produces a suitable swing in the collector voltage to hold the other transistor in the "off" state.

It will be appreciated that the "off" condition is therefore not stable. The incidence of an input pulse at the terminals 28 and 30 results in a voltage swing between the terminals 32 and 34 from approximately 0 volts to a value substantially equal to the voltage of the battery $E_7$ plus that of the battery $E_8$. This output voltage is temporary, being a function of the time constants of the respective feedback circuits. The circuit also produces simultaneous, temporary, equal positive and negative output pulses if we take the voltage between the terminals 32 and 34 and ground, respectively.

It will also be appreciated that we may modify the circuit of FIG. 1 to produce a monostable circuit by replacing only one of the resistors $R_{f1}$ or $R_{f2}$ with a condenser. The absence of a sustained feedback current in either feedback circuit results in the transistor having its base in that circuit eventually turning "on," and causing the other transistor similarly to turn "on."

Referring again to the bistable circuit of FIG. 1, it is apparent that if the circuit is in the "off" state, neither transistor draws appreciable current, and hence the power consumption of the circuit is at a low figure. This results in economical operation for any switching or control circuit which is characterized by substantial "standby" periods.

From the foregoing it will be appreciated that new and useful results have been achieved through the use of p-n-p and n-p-n transistors in a circuit with mutually connected feedback paths to produce monostable or bistable characteristics, wherein the effective output voltage swing is substantially the sum of the peak reverse voltages of the two transistors in response to an input pulse of either polarity, and wherein the voltages at the output terminals are at substantially the same potential difference with respect to ground but have reversed polarity relative thereto.

Having thus described the invention, we claim:

1. A trigger circuit comprising, in combination, a pair of junction transistors of complementary type, the first transistor of said pair having a first voltage source and a first impedance connected between its emitter and collector and a second voltage source of sufficient potential to bias its base relative to its emitter to produce a substantial current in said first impedance, the second transistor of said pair having a third voltage source and a second impedance connected between its emitter and collector and a fourth voltage source of sufficient potential to bias its base relative to its emitter to produce a substantial current in said second impedance, a feedback circuit connecting the collector of the first transistor and the base of the second transistor, and a feedback circuit connecting the collector of the second transistor and the base of the first transistor.

2. A trigger circuit comprising, in combination, a pair of junction transistors of complementary type, the first transistor of said pair having a first voltage source and a first impedance connected between its emitter and collector, its emitter being grounded, and a second voltage source of sufficient potential to bias its base relative to its emitter to produce a substantial current in said first impedance, the second transistor of said pair having a third voltage source and a second impedance connected between its emitter and collector, its emitter being grounded, and a fourth voltage source of sufficient potential to bias its base relative to its emitter to produce a substantial current in said second impedance, a feedback circuit connecting the collector of the first transistor and the base of the second transistor, and a feedback circuit connecting the collector of the second transistor and the base of the first transistor.

3. A trigger circuit comprising, in combination, a pair of junction transistors of complementary type, the first transistor of said pair having a first voltage source and a first impedance connected between its emitter and collector and a second voltage source of sufficient potential to bias its base relative to its emitter to produce a substantial current in said first impedance, the second transistor of said pair having a third voltage source and a second impedance connected between its emitter and collector and a fourth voltage source of sufficient potential to bias its base relative to its emitter and to produce a substantial current in said second impedance, a feedback circuit connecting the collector of the first transistor and the base of the second transistor including a third impedance of sufficient size to bias the second transistor to a low conduction state when substantially the full voltage of said first source appears at the collector of said first transistor, and a feedback circuit connecting the collector of the second transistor and the base of the first transistor including a fourth impedance of sufficient size to bias the first transistor to a low conduction state when substantially the full voltage of said third source appears at the collector of said transistor.

4. A monostable trigger circuit comprising, in combination, a pair of junction transistors of complementary type, the first transistor of said pair having a first voltage source and a first impedance connected between its emitter and collector and a second voltage source providing sufficient bias to its base relative to its emitter to produce a substantial current in said first impedance, the second transistor of said pair having a third voltage source and a second impedance connected between its emitter and collector and a fourth voltage source providing sufficient bias to its base relative to its emitter to produce a substantial current in said second impedance, a feedback circuit including direct current isolating means connecting the collector of the first transistor and the base of the second transistor, and a feedback circuit including direct current isolating means connecting the collector of the second transistor and the base of the first transistor.

5. A bistable trigger circuit comprising, in combination, a pair of junction transistors of complementary type, the first transistor of said pair having a grounded emitter, a first grounded voltage source and a first resistance series-connected therewith and connected with the collector of said first transistor, the second transistor of said pair having a grounded emitter, a second grounded voltage source and a second resistance series connected therewith and connected with the collector of said second transistor, a feedback circuit including a third grounded voltage source and a third resistance series connected therewith and connected with the base of the first transistor, a feedback circuit including a fourth grounded voltage source and a fourth resistance series-connected therewith and connected with the base of the second transistor, a fifth resistance connecting the base of the first transistor with the collector of the second transistor, and a sixth resistance connecting the base of the second transistor with the collector of the first transistor.

6. A bistable trigger circuit comprising, in combination, a pair of junction transistors of complementary type, the first transistor of said pair having a grounded emitter, a first grounded voltage source and a first resistance series-connected therewith and connected with the collector of the first transistor, a first feedback circuit including a second grounded voltage source and a second resistance series-connected therewith and connected with the base of the first transistor, and a third resistance connecting the base of the first transistor with the collector of the second transistor, the second transistor of said pair having a grounded emitter, a third grounded voltage source and a fourth resistance series-connected therewith and connected with the collector of the second transistor, a second feedback circuit including a fourth grounded voltage source and a fifth resistance series-connected therewith and connected with the base of the second transistor, and a sixth resistance connecting the base of the second transistor with the collector of the first transistor, said first feedback circuit being adapted to bias the base of said first transistor to produce a substantial current through said first source when the collector of the second transistor is near ground potential, and to substantially suppress said current when the collector of the second transistor is at a potential near that of the third voltage source, said second feedback circuit being adapted to bias the base of the second transistor to produce a substantial current through said third source when the collector of the first transistor is near ground potential, and to substantially suppress the current when the collector of the first transistor is at a potential near that of the third voltage source.

7. A trigger circuit comprising, in combination, a pair of junction transistors of complementary type, the first transistor of said pair having a first voltage source and a first impedance connected between its emitter and collector and a second voltage source of sufficient potential to bias its base relative to its emitter to produce a substantial current in said impedance, the second transistor of said pair having a third voltage source and a second impedance connected between its emitter and collector and a fourth voltage source of sufficient potential to bias its base relative to its emitter to produce a substantial current in said second impedance, a feedback circuit connecting the collector of the first transistor and the base of the second transistor, a first output terminal connected directly to the collector of the first transistor, a second output terminal connected directly to the collector of the second transistor, the output from the trigger circuit being taken across said terminals, a feedback circuit connecting the collector of the second transistor and the base of the first transistor, and an input circuit connected with the bases of both transistors, whereby an input pulse of one polarity triggers one transistor to the high conduction state when both transistors are in the low conduction state and triggers the other transistor to the low conduction state when both transistors are in the high conduction state, and whereby an input pulse of the opposite polarity triggers the other transistor to the high conduction state when both transistors are in the low conduction state and triggers the one transistor to the low conduction state when both transistors are in the high conduction state.

8. A bistable circuit comprising an n-p-n junction transistor, a p-n-p junction transistor, each transistor comprising an emitter, a collector and a base, means directly and conductively connecting said emitters to each other, a first load branch circuit connected to the collector of the n-p-n transistor and comprising in series a resistor and a first source of electrical energy having its positive terminal connected to said resistor, a second load branch circuit connected to the collector of the p-n-p transistor and comprising in series a second resistor and a second source of electrical energy having its negative terminal connected to said resistor, first and second cross-coupling impedance means connecting the respective collectors to the bases of the opposite transistor, and at least one signal input connected to one of the bases and adapted to produce a signal current pulse of limited duration, both transistors being maintained in a stable state of conductivity determined by said input signal current pulse even after said input signal pulse terminates.

References Cited in the file of this patent

UNITED STATES PATENTS

| | | |
|---|---|---|
| 2,531,076 | Moore | Nov. 20, 1950 |
| 2,620,448 | Wallace | Dec. 2, 1952 |
| 2,622,212 | Anderson | Dec. 16, 1952 |
| 2,655,609 | Shockley | Oct. 13, 1953 |
| 2,666,819 | Raisbeck | Jan. 19, 1954 |
| 2,776,420 | Woll | Jan. 1, 1957 |
| 2,788,449 | Bright | Apr. 9, 1957 |
| 2,802,067 | Zawels | Aug. 6, 1957 |

OTHER REFERENCES

"Transistors Theory and Practice," by Rufus P. Turner.

"Principles of Transistor Circuits," edited by R. F. Shea, John Wiley and Sons, Inc.